United States Patent [19]

Kompare

[11] Patent Number: 5,288,036
[45] Date of Patent: Feb. 22, 1994

[54] PIVOTING WIRE DEFLECTION AND SEVERING SYSTEM

[75] Inventor: Anton J. Kompare, Hamden, Conn.
[73] Assignee: United Technologies Corporation, Hartford, Conn.
[21] Appl. No.: 968,568
[22] Filed: Oct. 29, 1992
[51] Int. Cl.$^5$ ............................................. B64C 27/00
[52] U.S. Cl. ............................... 244/17.11; 244/1 R; 244/129.1; 114/221 A
[58] Field of Search ............... 244/1 R, 17.11, 129.1, 244/121; 83/639.5; 42/90; 89/1.11; 114/221 A

[56] References Cited

U.S. PATENT DOCUMENTS

| | | | |
|---|---|---|---|
| 1,273,287 | 7/1918 | Stankowicz | 42/90 |
| 3,915,043 | 10/1975 | Smith et al. | 114/221 A X |
| 4,215,833 | 8/1980 | Chan | 244/17.11 |
| 4,826,103 | 5/1989 | McKown | 244/1 R |

Primary Examiner—Margaret A. Focarino
Assistant Examiner—Christopher P. Ellis
Attorney, Agent, or Firm—Terrance J. Radke

[57] ABSTRACT

A pivoting wire deflection and severance (PWDS) system that provides protection against wire/cable strikes for aircraft, especially helicopters, having external, belly-mounted gun systems that are pivotable in the elevational plane. The PWDS system is operative to protect against wire/cable strikes with the gun system in a forward stowed flight position and with the gun system pivoted to any position within the predetermined elevation angle of the gun system. The PWDS system includes a hard mounted wire cutter and a pivotable deflector member. The wire cutter includes upper and lower cutting jaws disposed in a housing and operative to sever wires/cables. The wire cutter housing is mounted in combination with the gun system so that the wire cutter provides protection against wire/cable strikes with the gun system in the forward stowed flight position. The deflector member is an elongated structure having first and second ends. The first end of the deflector member is affixed in pivotable combination with the wire cutter housing. The second end of the deflector member is mounted in translational and rotational combination with the gun system. The deflector member is operative for synchronized movement with the elevational movement of the gun system to provide protection from wire/cable strikes within the critical strike zone defined by the predetermined elevation angle of the gun system by deflecting incident wires/cables within the critical strike zone into the wire cutter.

7 Claims, 4 Drawing Sheets

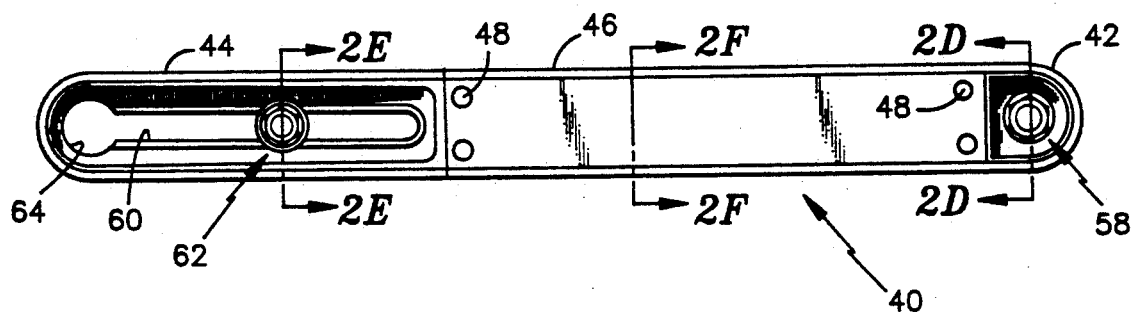
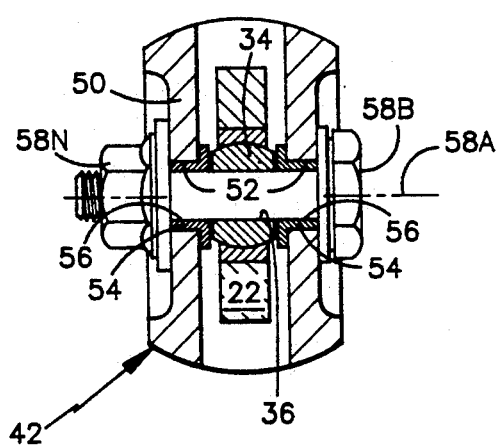
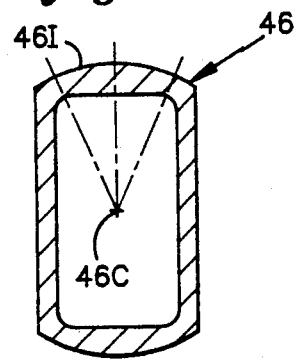
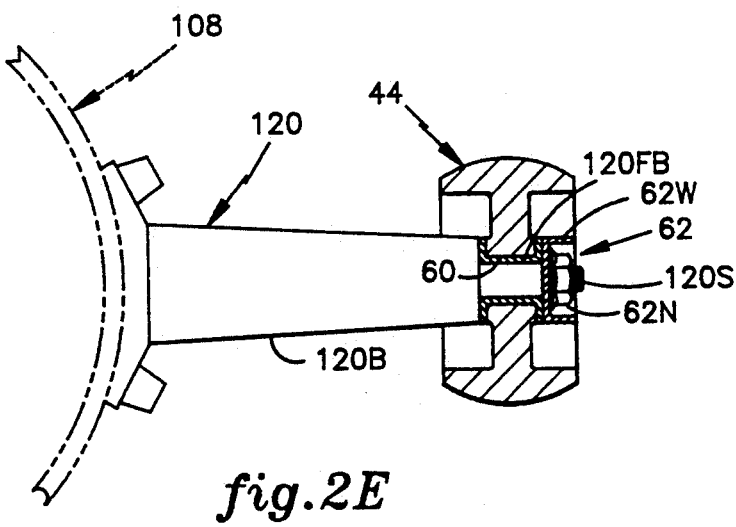

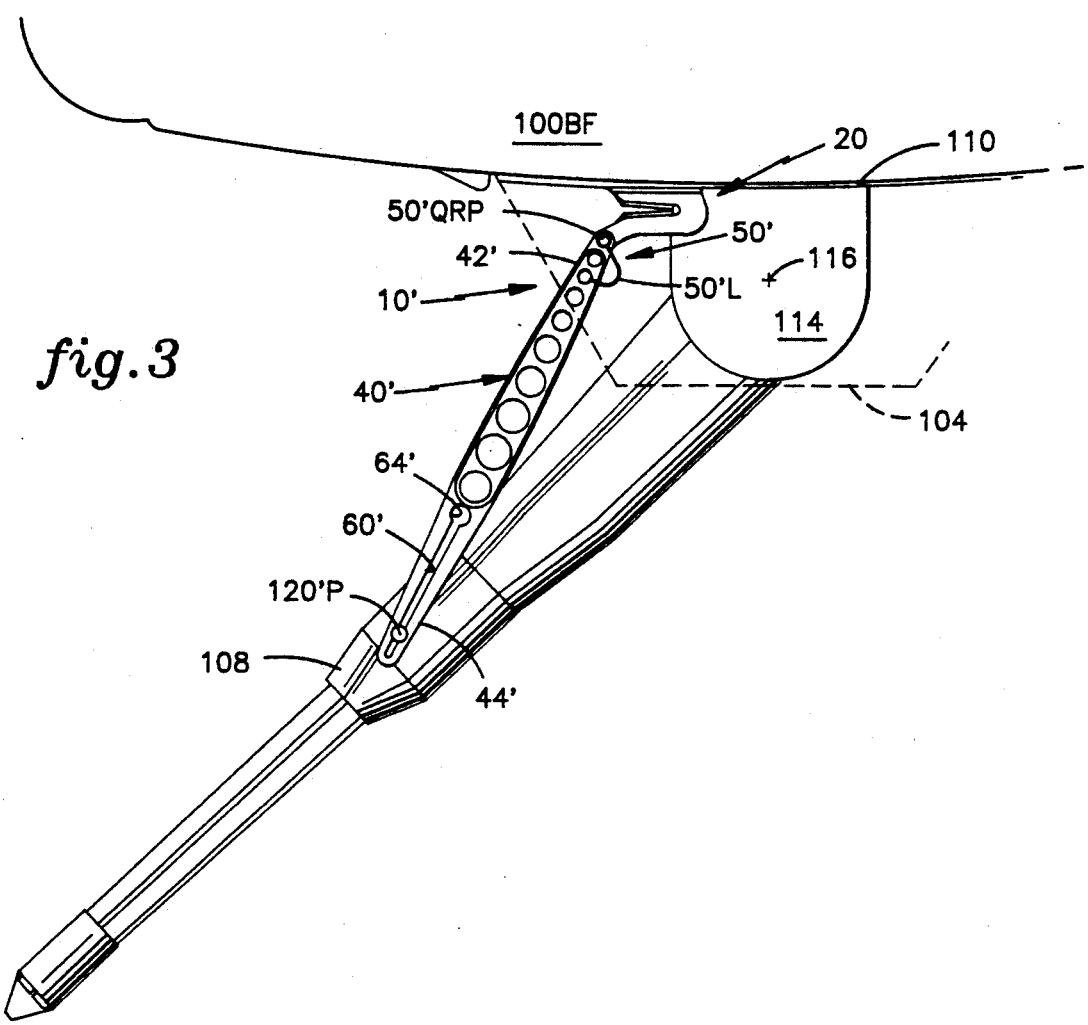

** # PIVOTING WIRE DEFLECTION AND SEVERING SYSTEM

This invention was made under a Government Contract and the Govnment has rights therein.

TECHNICAL FIELD

The present invention relates to wire cutter systems for aircraft, and more particularly to a pivoting wire deflection and severing system for protecting low flying aircraft having external, belly-mounted gun systems from wire/cable strikes. The pivoting wire deflection and severing system has particular utility in combination with helicopters embodying external, belly-mounted gun systems.

BACKGROUND OF THE INVENTION

Aircraft flight operations may involve flight patterns that occur in close proximity to the ground. Helicopter flight operations, in particular, typically involve a significant amount of flight time in close proximity to the ground. This is particularly true of military helicopters with the advent of more sophisticated avionics and flight equipment that make nap-of-the-earth flight operations feasible as a routine tactical flight philosophy.

Helicopter flight operations in close proximity to the ground are subject to two serious types of ground threats: gun fire (active); and wire/cable strikes (passive). These ground threats have become a serious concern with the increasing emphasis on nap-of-the-earth helicopter flight operations.

During the Vietnam War, many helicopters were neutralized or destroyed as a result of encounters with steel cables stretched between trees. Such cables were purposely positioned to wrap around the helicopter rotor head to disable the helicopter, or, if the speed of the helicopter was sufficiently high, to tear through the helicopter fuselage for complete destruction thereof.

To mitigate this liability in low level helicopter flight operations, wire cutter systems were developed and incorporated into the basic helicopter configuration. Such wire cutter systems are operative to deflect wires/cables encountered during low level flight operations into the throat of a wire cutter. The momentum of the helicopter, in combination with the sharpness of the cutter blades, is sufficient to sever wires/cables before damage can be inflicted upon the helicopter.

Wire cutter systems are currently utilized on helicopters engaged in low level flight operations where there is a high probability of encountering wires/cables. For example, almost all military helicopters incorporate wire cutter systems. In addition, federal and state helicopters utilized in illegal alien operations typically incorporate wire cutter systems. It is not uncommon for such helicopters to strike numerous telephone and/or power lines while engaged in illegal alien flight operations. Telephone and/or power lines in themselves are not the primary concern, but rather the steel cables (up to three eights inch diameter) that are disposed in combination with such lines for the support thereof. These steel cables are similar to the type encountered by helicopters during the Vietnam War.

Wire cutter systems must be effectively designed and utilized to sever such support cables. One limitation of prior art wire cutter systems is that each cutter system is fixedly mounted in combination with the helicopter. Hence, each cutter system is only effective in protecting helicopters from wire/cable strikes over a limited strike zone.

To overcome this limitation, many wire cutter systems incorporate a deflector member that is operative to direct/deflect encountered wires/cables into the jaws of the cutter. The placement of these deflector members, therefore, is extremely critical if the wire cutter system is to have the capability to provide maximum protection for the helicopter.

A special problem arises for helicopters having external, belly-mounted gun systems. The gun system and the belly of the helicopter in combination form a crevice that defines a critical strike zone capable of entrapping wires/cables that may severely damage the belly-mounted gun system and/or the helicopter. If the gun system is capable of pivoting motion in the elevational plane, the critical strike zone defined by the helicopter and the gun carriage in combination becomes extremely large. For example, the AH-64 Apache helicopter incorporates an external, belly-mounted gun system having the capability of pivoting motion in the elevational plane. In consequence, the Apache helicopter employs multiple fixed cutters and deflector members to protect the critical strike zone defined by the external, belly-mounted gun system and the lower fuselage of the helicopter from wire/cable strikes.

More specifically, the Apache helicopter requires two wire cutter systems just to protect the belly-mounted gun system: one belly-mounted wire cutter system and one wire cutter system fixedly mounted on the gun. The belly-mounted wire cutter provides effective protection against incident wires/cables that slide along the lower fuselage of the helicopter. The gun-mounted wire cutter provides effective protection against incident wires/cables that impact the gun below the mounted wire cutter. Thus, while these wire cutter systems are generally effective in protecting the gun system and helicopter from wire/cable strikes under certain conditions, a large unprotected strike zone still exists if the gun system is pivotally positioned in other than the stowed flight condition, i.e., the gun system is in a depressed position. In addition, the need to provide multiple wire cutter systems results in a system weight penalty.

A need exists to provide a lightweight wire cutting system for helicopters (and other types of low flying aircraft) that embody external, belly-mounted gun systems, especially those having guns capable of pivoting motion in the elevational plane. Such a lightweight wire cutting system should be configured to minimize the number of individual wire cutters and deflector members while concomitantly providing maximum protection from wire/cable strikes for the critical strike zone defined by the pivotal range of the external, belly-mounted gun system.

SUMMARY OF THE INVENTION

One object of the present invention is to provide a pivoting wire deflection and severance system that provides protection against wire/cable strikes for aircraft having external, belly-mounted gun systems that are pivotable in the elevational plane.

Another object of the present invention is to provide a pivoting wire deflection and severance system that provides protection against wire/cable strikes over the pivotal range of the gun system.

These and other objects are achieved by a pivoting wire deflection and severance (PWDS) system according to the present invention that is operative to protect aircraft having external, belly-mounted gun systems capable of pivotal movement over a predetermined elevational range against wire/cable strikes with the gun system in a forward stowed flight position and with the gun system pivoted to any position within the predetermined elevational range. The PWDS system includes a hard mounted wire cutter and a pivotable deflector member.

The wire cutter comprises upper and lower cutting jaws disposed in a housing and operative to sever incident and/or deflected wires/cables. The wire cutter housing is hard mounted in combination with the gun system and the upper leading edge thereof configured to direct incident wires/cables into the upper and lower cutting jaws so that the wire cutter provides protection against wire/cable strikes with the gun system in the forward stowed flight position by severing such incident wires/cables. The lower leading edge of the wire cutter housing is configured to facilitate affixing the deflector member in pivotable combination therewith.

The preferred embodiment of the pivotable deflector member includes a first end fitting, a second end fitting, and a middle tubular portion that are configured to be secured in combination to form the deflector member. The first end fitting has an attachment configuration for affixing the deflector member in pivotable combination with the wire cutter housing. The second end fitting is configured with an axial slot for affixing the deflector member in translational and rotational combination with the gun system. The middle tubular portion is configured to minimize/eliminate the effects of impact loads as a result of wire/cable strikes. The deflector member, as mounted in combination with the wire cutter and the gun system, is operative for synchronized movement with the pivotal movement of the gun system over the pivotal range thereof. The deflector member is operative over such pivotal range to deflect incident wires/cables to the wire cutter for severance thereof.

BRIEF DESCRIPTION OF THE DRAWINGS

A more complete understanding of the present invention and the attendant features and advantages thereof may be had by reference to the following detailed description when considered in conjunction with the accompanying drawings wherein:

FIGS. 2A-2F depict a preferred embodiment of a pivoting wire deflection and severing (PWDS) system according to the present invention.

FIG. 2A illustrates the PWDS system mounted in combination with the gun system of FIG. 1A.

FIG. 2B illustrates the PWDS system mounted in combination with the gun system of FIG. 1B.

FIG. 2C is a plan view of the deflector member of the PWDS system of FIGS. 2A, 2B.

FIG. 2D is a cross-sectional view of the mechanical interface between the wire cutter and the deflector member comprising the PWDS system along line D—D of FIG. 2C.

FIG. 2E is a cross-sectional view of the mechanical interface between the gun and the deflector member along line E—E of FIG. 2C.

FIG. 2F is a cross-sectional view of the tubular middle portion of the deflector member along line F—F of FIG. 2C.

FIG. 3 illustrates an alternative embodiment of the PWDS system according to the present invention.

DESCRIPTION OF PREFERRED EMBODIMENTS

Figure 1:
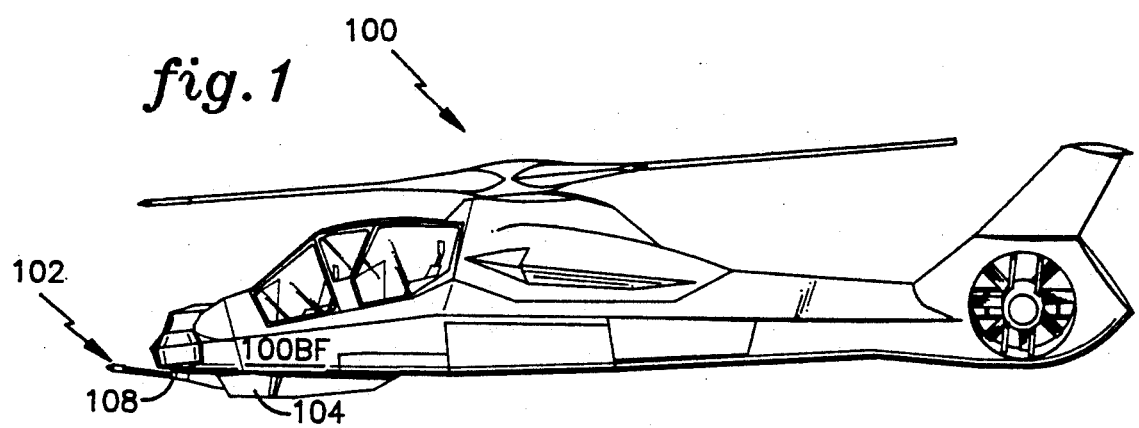
FIG. 1 is a perspective view of a helicopter having an external, belly-mounted gun system that includes a gimbal mechanism for pivoting the gun through a predetermined elevational angle.

Referring now to the drawings wherein like reference characters identify identical or equivalent elements throughout the several views, FIG. 1 depicts a helicopter 100 (the RAH-66 Comanche helicopter being developed by Sikorsky Aircraft and Boeing) that incorporates an external gun system 102 that is mounted to the belly 100BF of the helicopter fuselage. As illustrated in FIG. 1, a two member gun fairing 104 (one fairing member is attached to the fuselage; the other fairing member rotates with the gun system 102) is removably mounted to the fuselage belly 100BF to house the gun system 102 for certain flight operations. The fairing 104 minimizes the electromagnetic detection probability of the helicopter 100 due to the externally mounted gun system 102.

Figure 1A:
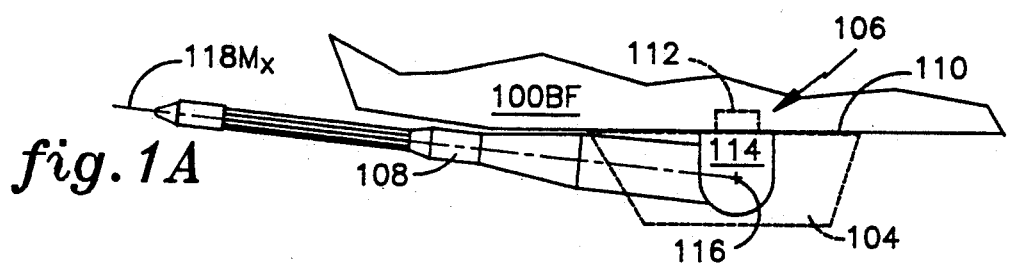
FIG. 1A depicts the gun system of FIG. 1 with the gun at maximum elevation.
Figure 1B:
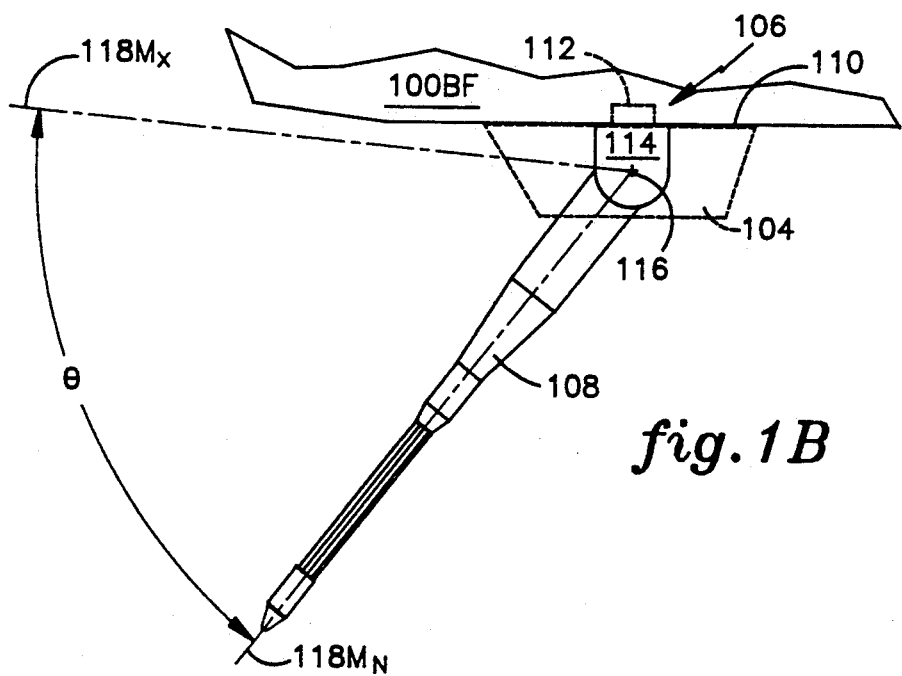
FIG. 1B illustrates the gun system of FIG. 1 with the gun at minimum elevation.

Many of the proposed mission profiles for the Comanche helicopter 100 are intended to be flown with the fairing 104 removed such that the belly-mounted gun system 102 is exposed. In this configuration, illustrated in FIGS. 1A, 1B, the gun system 102 is vulnerable to wire/cable strikes. The gun system 102 includes a gun 108 and means 106 for positioning the gun 108 for two axis motion. The positioning means 106 includes a platform 110, means 112 for rotating the platform 110, and a gimbal mechanism 114.

The platform 110 is rotatably mounted in combination with the fuselage belly 100BF. The rotating means 112 is functionally interconnected with the platform 110 and operative to rotate the platform 110 with respect to the fuselage belly 100BF. This provides the capability to rotate the gun 108 azimuthally (first axis of motion) through 180° with respect to the longitudinal axis of the helicopter 100. The gun system 102 is only rotated to the aft position (180° azimuth) when the fairing 104 is temporarily mounted to the fuselage 100BF inasmuch as the gun system 102 in the 180° azimuthal position is stowed within the fairing 104. With the fairing 104 removed, the helicopter 100 is flown with the gun system 102 in a forward stowed flight position (see FIG. 1A).

The gimbal mechanism 114 is fixedly secured to the platform 110. The gun 108 and gimbal mechanism 114 are operatively disposed in combination. The gimbal mechanism 114 is operative to pivot the gun 108, about the pivot axis 116 of the gimbal mechanism 114, to any position from a maximum elevation position (forward stowed flight position as defined by gun centerline $118_{Mx}$ illustrated in FIG. 1A) to a minimum elevation position (fully depressed position as defined by gun centerline $118_{Mn}$ illustrated in FIG. 1B). The extreme elevation positions, which define the operating range of the gimbal mechanism 114, also define a predetermined elevation angle $\theta$ that corresponds to the second axis of motion of the gun system 102. The predetermined elevation angle $\theta$ effectively defines the critical strike zone wherein the gun system 102 is susceptible to wire/cable strikes.

A preferred embodiment of a pivoting wire deflection and severance (PWDS) system 10 according to the present invention is disposed in combination with the gun system 102 described hereinabove and is illustrated in FIGS. 2A-2F. The PWDS system 10 according to the present invention is operative, utilizing a single wire cutter, to protect the external, belly-mounted gun system 102 from wire/cable strikes with the gun system 102 in the forward stowed flight position. Further, the PWDS system 10 is operative to protect the gun system 102 from wire/cable strikes throughout the critical strike zone defined by the predetermined elevation angle $\theta$. The mechanical and functional configuration of the PWDS system 10 according to the present invention, and the interaction thereof in combination with the gun system 102, is driven by certain physical constraints.

The functional configuration of the PWDS system 10 is optimized to utilize a single cutter and pivotable deflector member in combination to provide protection from wire/cable strikes in the stowed flight position and over the critical strike range of the gun system 102, i.e., the predetermined elevation angle $\theta$. The mounting of the system 10 in combination with the gun system 102 is optimized to minimize interference with gun 108 movement at or near the maximum elevation position. The physical configuration of the components and the interaction between components of the system 10 is optimized to minimize induced moments from wire/cable strikes. The physical configuration is further optimized to minimize weight. The physical configuration and interaction between system 10 components is also optimized to ensure that wire/cable strikes do not occur at incidence angles of about 55° or greater. In wire/cable strikes at incidence angles less than 55°, the inherent momentum of an incident wire/cable is effectively negated through relative sliding motion between the impacted structure and the incident wire/cable. At incidence angles of about 55° or greater, such sliding motion between the incident wire/cable and the impacted structure does not occur. Rather, the inherent momentum of the incident wire/cable is expended against the impacted structure, resulting in damage and/or destruction thereof.

Figure 2A:
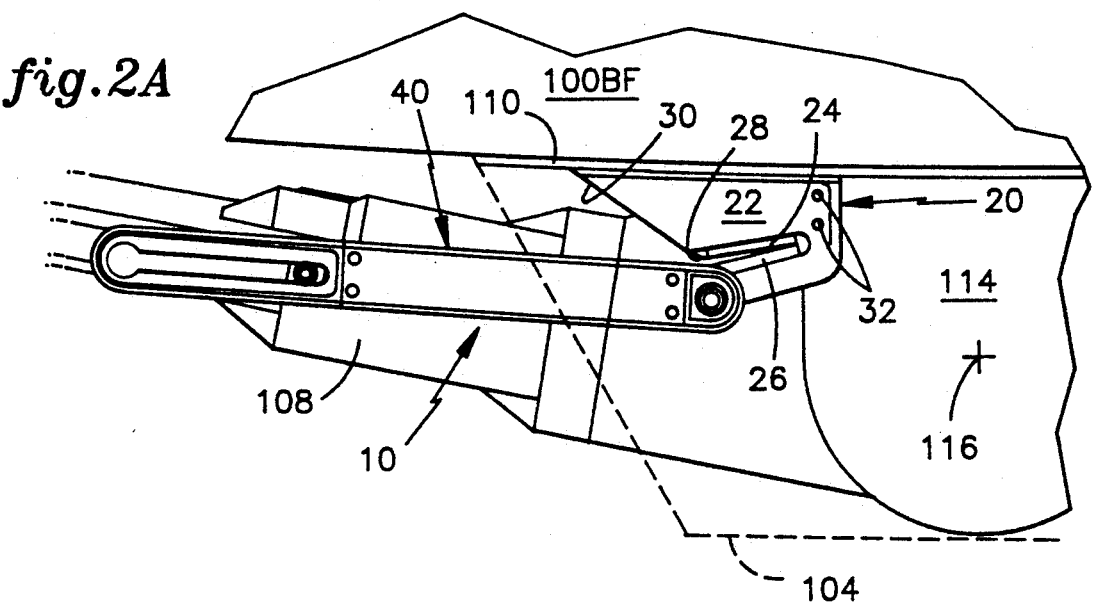
Figure 2B:
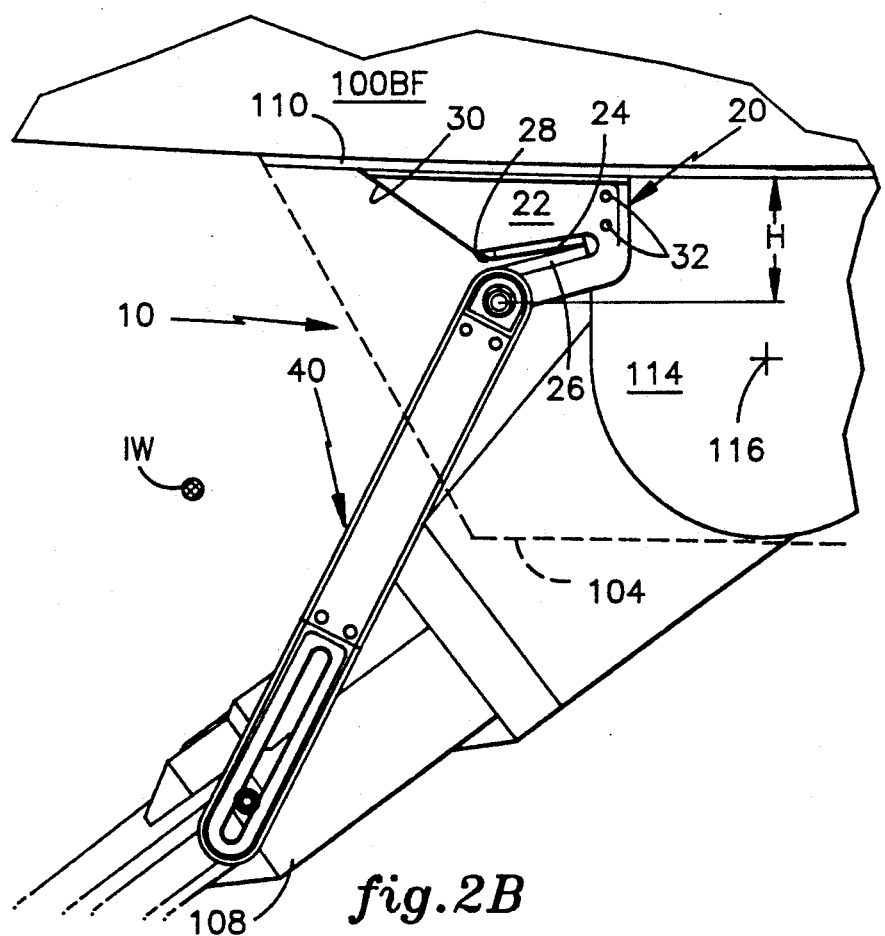

The PWDS system 10 comprises a hard mounted wire cutter 20 and a pivotable deflector member 40. The wire cutter 20, illustrated in FIGS. 2A, 2B, is operative to sever incident wires/cables, with the gun system 102 in the forward stowed flight position and over the critical strike zone with the gun system 102 in a depressed position, before such wires/cables inflict damage on the external, belly-mounted gun system 102. The embodiment of the wire cutter 20 described herein is a conventional wire cutter of the type manufactured for aerospace applications, e.g., of the type manufactured by Bristol Aerospace.

The wire cutter 20 comprises a housing 22 formed of a lightweight, rigid material such as aluminum. Upper and lower cutting jaws 24, 26 are mounted in the housing 22. The upper and lower cutting jaws 24, 26 have lengths and angles generally known to those skilled in the art for utility in severing wires/cables encountered during flight operations (for the described embodiment, wires/cables are trapped up to about a 30° angle of incidence). The cutting jaws 24, 26 are fabricated from high strength material such as stainless steel. Optionally, the cutting jaws 24, 26 may be coated with rubber to protect the jaws 24, 26 prior to an initial wire/cable strike. The first and second cutting jaws 24, 26 in combination define a cutter throat 28 for the wire cutter 20 that provides the capability to accommodate wires/cables of up to three-eights inch diameter.

The wire cutter 20 is hard mounted to provide protection from wire/cable strikes with the gun 108 of the gun system 102 in the maximum elevation position (see FIG. 2A), i.e., so that incident wires/cables are deflected into the throat 28 of the wire cutter 20 and severed by the upper and lower cutting jaws 24, 26 before impact with the gimbal mechanism 114. To enhance the protective capability of the wire cutter 20 against wire/cable strikes with the gun 108 of the gun system 102 in the maximum elevation position, the upper leading edge 30 of the housing 22 is configured to provide a shallow incidence angle (for the described embodiment, an incidence angle of about 30° to incident wires/cables sliding along the fuselage belly 100BF) that deflects such wires/cables into the throat 28 of the wire cutter 20 for severance thereof. The wire cutter 20 is mounted off-center from the centerline of the helicopter 100 so that the cutter 20 does not interfere with elevational movements of the gun 108 at or near the maximum elevation position.

The housing 22 of the wire cutter 20 is hard mounted to the platform 110 of the gun positioning means 106 by any conventional technique so that the upper and lower cutting jaws 24, 26 are positioned immediately forward of the gimbal mechanism 114 and are off-set from the centerline of the helicopter 100, as described hereinabove and as illustrated in FIGS. 2A, 2B. For the described embodiment of the wire cutter 20, the housing 22 is further fixedly secured to the housing of the gimbal mechanism 114 by conventional means such as bolts 32. The housing 22 has a predetermined height H (see FIG. 2B) that is minimized to reduce the effects of induced moments as a result of wire/cable strikes.

The lower leading portion of the housing 22 is configured to facilitate pivotal attachment of the deflector member 40 in combination with the wire cutter 20. A spherical bearing 34 is staked into the lower leading portion of the housing 22, as illustrated in FIG. 2D. The spherical bearing 34 includes an attachment aperture 36 for mounting the deflector member 40 in pivotal combination with the wire cutter housing 22.

The pivotable deflector member 40 is operative to deflect incident wires/cables encountered within the critical zone $\theta$ into the throat 28 of the wire cutter 20. The deflector member 40 is mounted in combination with the wire cutter 20 and the gun 108 and operative for synchronized movement with the pivotal elevational movement of the gun 108 to provide protection from wire/cable strikes within the critical strike zone $\theta$ defined by such pivotal movement. The deflector member 40 is mounted in combination with the gun 108 so that impact loading as a result of wire/cable strikes is distributed between the housing 22 and the gun 108. The deflector member 40 is structurally configured to minimize side loading due to wire/cable strikes and to eliminate induced moments arising from wire/cable strikes.

The deflector member 40 is an elongated structure that is fabricated from a lightweight, rigid material such as an aluminum-beryllium alloy or carbon fiber. Composite as illustrated in FIG. 2C, the deflector member 40 for the preferred embodiment of the PWDS system 10 comprises three elements: first and second end fittings 42, 44 and a middle tubular portion 46. The first and second end fittings 42, 44 are configured to be inserted in combination with the middle portion 46 and secured thereto by conventional means such as rivets 48 to form the deflector member 40.

The first end fitting 42 is configured for affixing the deflector member 40 in pivotable combination with the wire cutter 20. As shown in FIG. 2D, the first end fitting 42 has a clevis configuration 50 that includes apertures 52. Bushings 54 having attachment apertures 56 are press fit into the clevis apertures 52. The first end fitting 42 is pivotally affixed to the spherical bearing 34 in the lower leading portion of the wire cutter housing 22 by an attachment means 58 such as an attachment bolt 58B inserted through the aligned attachment apertures 36, 56 and secured therein by a self-locking nut 58N. The spherical bearing 34 is operative to accommodate pivotal motion between the deflector member 40 and the wire cutter 20 (about the bolt axis 58A) when the gun 108 is pivoted by means of the gimbal mechanism 114. The spherical bearing 34 also accommodates side loading induced in the deflector member 40 due to wire/cable strikes, as well as compensating for a degree of angular misalignment of the first and second end fittings 42, 44.

The second end fitting 44 is configured for affixing the deflector member 40 in translational and rotational combination with the gun 108. The gun 108 of the gun system 102 is modified (if required) to include means 120 for affixing the second end fitting 44 in combination therewith. As shown in FIG. 2E, the means 120 includes a bracket 120B secured in combination with the gun 108. The bracket 120B includes an integral threaded stud 120S having a double flanged bushing 120FB (alternatively, two single flanged bushings) mounted thereon. The flanged bushing 120FB is preferably fabricated from a low friction material such as high impact plastic.

As shown in FIGS. 2C, 2E, the second end fitting 44 includes an axial slot 60 that is dimensioned to accommodate translational movement of the flanged bushing 120FB therein. The first and second end fittings 42, 44 rotate relative to the spherical bearing 34 and the flanged bushing 120FB, respectively. The axial slot 60 compensates for the fact that the gun system 102 and the deflector member 40 rotate about different axes, i.e., pivotal axis 116 versus bolt axis 58A).

The axial slot 60 may include a clearance cutout 64 so that the double flanged bushing 120FB of the bracket 120B can be inserted through the clearance cutout 64 and into the axial slot 60 to engage the second end fitting 44 in combination with gun bracket 120B. If the axial slot 60 does not include the clearance cutout 64, two single flanged bushings 120FB are utilized inasmuch as the double flanged bushing 120FB requires the clearance cutout 64 for mounting. An attachment means 62 is utilized to affix the flanged bushing 120FB of the gun system 102 in translational and rotational combination in the axial slot 60 of the second end fitting 44. For the described embodiment, the attachment means 62 comprises a cup-shaped washer 62W, which is operative to resist side loading, that is inserted onto the threaded stud 120S and secured thereto by means of a self-locking nut 62N (the self-locking nut 62N and the self-locking nut 58N are identical for part commonality). When the gun 108 is pivoted, the flanged bushing 120FB translates within the axial slot 60 so that the deflector member 40 pivots in synchronization with the gun 108. The axial slot 60 has a predetermined length that is coordinated to synchronize the translational movement of the flanged bushing 120FB within the axial slot 60 with the predetermined elevation angle $\theta$ through which the gun 108 is capable of being pivoted. The clearance cutout 64 also facilitates disengagement of the second end fitting 44 from the gun bracket 120B without removing the self-locking nut 62N from the integral stud 120S.

The middle portion 46 of the deflector member 40 has a hollow tubular configuration, as illustrated in FIG. 2F, that provides torsional rigidity and weight savings. The external configuration of the middle portion 46 (as well as the first and second end fittings 42, 44—see FIGS. 2D, 2E, respectively) is optimized to minimize/eliminate side loading effects due to wire/cable strikes at angles of incidence up to about $\pm 30°$. The impact surface 46I of the middle portion 46 has an external configuration defined by an arc segment of a circle having a center coincident with the centroid 46C of the middle portion 46. Impact loads (due to wire/cable strikes) acting on the impact surface 46I have lines of action (see reference characters IL in FIGS. 2F, 2E) that pass through the centroid 46C of the middle portion 46 as a result of such external configuration. Therefore, impact loading as a result of wire/cable strikes does not induce moments into the first and second end fittings 42, 44 of the deflector member 40.

With reference to FIG. 2B, the physical configurations of the wire cutter 20 and deflector member 40 of the PWDS system 10 according to the present invention, and the interactions among the wire cutter 20, deflector member 40, and gun system 102, are such that the deflector member 40, with the gun 108 in the minimum elevation position, is orientated at an angle of less than about 55° with respect to incident wires/cables (see reference character IW in FIG. 2B). This position of the PWDS system 10 is the most critical with respect to incident cables/wires, and the foregoing orientation of the deflector member 40 ensures that incident wires/cables within the critical strike zone defined by the elevational range of the gun system 102 are deflected into the throat 28 of the wire cutter 20 by the deflector member 40.

Another embodiment of the PWDS system 10' according to the present invention is illustrated in FIG. 3. The wire cutter 20 for the PWDS system 10' is equivalent in structure and function to the wire cutter 20 described hereinabove. The deflector member 40' for the PWDS system 10' provides the same functions as the deflector member 40 described hereinabove. The deflector member 40' for the PWDS system 10' embodiment, however, has a different structural configuration.

The deflector member 40' comprises a unitary elongated structure having first and second ends 42', 44' and having material portions thereof removed for weight savings. The first end 42' is configured for affixing the deflector member 40' in pivotable combination with the wire cutter 20. The first end 42' includes an attachment aperture (not shown). The first end 42' is pivotally affixed to the lower leading portion of the wire cutter housing 22 by attachment means 50' that comprises a quick release pin 50'QRP inserted through the aligned attachment apertures of the wire cutter housing 22 and the first end 42' of the deflector member 40'. The pin 50'QRP is permanently attached to the deflector member 40' by means of a swaged lanyard cable 50'L. The attachment means 50' for the PWDS system 10' embodiment facilitates field removal of the deflector member

40' by utilizing the pin 50'QRP to readily detach the first end 42' from the wire cutter housing 22. The lanyard 50'L ensures that the pin 50'QRP is not inadvertently misplaced during field removal procedures.

The second end 44' is configured for affixing the deflector member 40' in translational and rotational combination with the gun 108. The gun 108 of the gun system 102 is modified (if required) to include affixing means 120' such as a flange-headed pin 120'P secured thereto. An axial slot 60' is formed in the second end 44' and dimensioned to accommodate translational movement of the pin 120'P therein. A clearance cutout 64' is formed in the axial slot 60' to facilitate insertion and removal of the flange-headed pin 120'P from the axial slot 60'. When the gun 108 is pivoted, the pin 120'P translates within the axial slot 60' so that the deflector member 40' pivots in synchronization with the gun 108. The length of the axial slot 60' is coordinated to synchronize the predetermined elevation angle $\theta$ through which the gun 108 is capable of being pivoted with the translational movement of the pin 120P within the axial slot 60'. The configuration of the axial slot 60' and the clearance cutout 64' facilitates field removal of the deflector member 40' by withdrawing the pin 120'P through the clearance cutout 64' to readily detach the second end 44' from the gun system 102.

A variety of modifications and variations are possible in light of the above teachings. It is therefore to be understood that, within the scope of the appended claims, the invention may be practiced otherwise than as specifically described herein.

What is claimed is:

1. In combination with an aircraft having an external, belly-mounted gun system that is pivotable in an elevational plane to any position from a stowed flight position to a fully depressed position, a critical strike zone with respect to cable strikes being defined between the stowed flight position and the fully depressed position of the gun system, a pivoting wire deflection and severance system, comprising:

wire cutter means disposed in combination with the gun system for severing incident cables to provide protection against cable strikes with the gun system in the stowed flight position; and deflector member means for providing protection against cable strikes within the critical strike zone by deflecting incident cables within the critical strike zone into said wire cutter means, said deflector member means including first means for affixing said deflector member means in pivotable combination with said wire cutter means, and second means for affixing said deflector member means in translational and rotational combination with the gun system, wherein said deflector member means is operative for synchronized movement with the pivotal elevational movement of the gun system to deflect incident cables within the critical strike zone into said wire cutter means for severance thereof.

2. The pivoting wire deflection and severance system of claim 1 wherein said deflector member means comprises:

a first end fitting configured for affixing said deflector member means in pivotable combination with said wire cutter means;

a second end fitting configured for affixing said deflector member means in translational and rotational combination with the gun system; and a middle tubular portion configured to accommodate impact loading due to cable strikes;

said first and second end fittings being further configured for insertion in combination with said middle tubular portion and securement therewith to form said deflector member means.

3. The pivoting wire deflection and severance system of claim 2 wherein said second end fitting includes an axial slot and said second affixing means includes a threaded stud and flanged bushing combination as part of the gun system, the combination being inserted through said axial slot and secured therein to affix said second end fitting in translational and rotational combination with the gun system such that said axial slot translates and rotates with respect to the combination when the gun system is pivoted, causing said deflector member means to pivot in synchronization with the gun system.

4. The pivoting wire deflection and severance system of claim 3 wherein said axial slot has a predetermined length that is coordinated to synchronize the translational and rotational movement of said axial slot with the pivotal movement of the gun system.

5. The pivoting wire deflection and severance system of claim 3 wherein said axial slot has a clearance cutout.

6. The pivoting wire deflection and severance system of claim 2 wherein said wire cutter means has a spherical bearing staked in combination therewith and further wherein said first end fitting has an attachment aperture and said first affixing means includes an attachment bolt and a self-locking nut, said attachment bolt being inserted through said attachment aperture and said spherical bearing and secured therein by said self-locking nut to affix said deflector member means in pivotable combination with said wire cutter means.

7. The pivoting wire deflection and severance system of claim 1 wherein said deflector member means comprises:

an elongated structural member having first and second ends, said first end having an attachment aperture and said first affixing means including a quick release pin inserted through said attachment aperture to affix said elongated structural member in pivotable combination with said wire cutter means, and said second end having an axial slot and a clearance cutout formed at one end of said axial slot and said second affixing means including a flange-headed pin secured in combination with the gun system, the flange-headed pin being inserted into said axial slot by means of said clearance cutout to affix said elongated structural member in translational and rotational combination with the gun system.

* * * * *